United States Patent [19]

Romeo et al.

[11] Patent Number: 4,684,997

[45] Date of Patent: Aug. 4, 1987

[54] MACHINE FOR THE READING, PROCESSING AND COMPRESSION OF DOCUMENTS

[76] Inventors: Françoise Romeo, 23 rue Henri Bourrelier, 91370 Verrieres-le-Buisson; Pascale Joly, 42 rue de la Colonie, 75013 Paris, both of France

[21] Appl. No.: 844,005

[22] Filed: Mar. 25, 1986

[30] Foreign Application Priority Data

Mar. 29, 1985 [FR] France ............................. 85 04828

[51] Int. Cl.[4] ............................................. H04N 1/40
[52] U.S. Cl. .................................. 358/263; 358/260; 358/280; 382/56
[58] Field of Search ............... 358/256, 260, 263, 280; 382/56, 9

[56] References Cited

U.S. PATENT DOCUMENTS

| | | | |
|---|---|---|---|
| 4,410,916 | 10/1983 | Pratt et al. | 358/263 |
| 4,415,880 | 11/1983 | Scott | 382/56 |
| 4,491,874 | 1/1985 | Yamamoto | 358/260 |
| 4,606,069 | 8/1986 | Johnsen | 382/56 |

FOREIGN PATENT DOCUMENTS 0006131  9/1980  European Pat. Off. .

OTHER PUBLICATIONS

W. K. Pratt et al., "Combined Symbol Matching Facsimile Data Compression System" Proceedings of the IEEE, vol. 68, No. 7, Jul. 1980, pp. 786-795.

R. L. T. Cederberg, "Chain-Link Coding and Segmentation for Raster Scan Devices" Computer Graphic and Image Processing, 1979, pp. 224-234.

R. Lumita et al., "A New Connected Components Algorithm for Virtual Memory Computers, Computer Vision Graphic and Image Processing" 1983, pp. 287-300.

O. Johnson et al., "Coding of Two-Level Pictures by Pattern Matching and Substitution" The Bell Technical Journal, vol. 62, 10-8-83, pp. 2513-2545.

*Primary Examiner*—Edward L. Coles, Sr.
*Attorney, Agent, or Firm*—Pearne, Gordon, McCoy & Granger

[57] ABSTRACT

A machine for the reading, processing and compression of documents. This machine utilizes a separate image bus and communication bus. The image bus links a reader having a plurality of reading members for the reading of documents of different types, an image memory, and an extraction device for extracting the related components of the image. The communication bus connects the reader, the extraction device, a coding device, a merging device, and a controller. The coding device comprises several specific coders, each coder processing a given type of related components (lines, symbols, non-symbols, etc).

8 Claims, 2 Drawing Figures

MACHINE FOR THE READING, PROCESSING AND COMPRESSION OF DOCUMENTS

The present invention relates to a machine for the reading, processing and compression of black and white documents. This machine can be used in all processors for producing electronic records. The compression by this machine of the information contained in the document to be filed makes it possible to significantly reduce the volume of the storage supports compared with the direct filing of said document. The present machine more particularly relates to the filing of technical documentation (telecommunications, aeronautical and automobile industries, etc), library filing or records (scientific or the like), office automation and company communications (insurance companies, banks, etc).

Several machines for reading, processing and compressing documents are known. These machines are generally limited to a particular application and can only deal with a single category of predetermined documents, either on the basis of the size or format, or by the nature of the physical support of this document. Moreover, in the known documents, the compression of the information contained in the processed document is obtained by a fixed coding method specific to the machine and nature of the document processed. These known machines are in particular telecopiers, press facsimile machines and optical readers.

A telecopier is a machine for the reading, processing and compression of documents on an A4 paper support. The document is analyzed by line-by-line scanning using an array of photodiodes with a resolution of approximately 8 dots per mm. The digital image of the document resulting from this analysis is then coded prior to transmission, several coding methods being used. A first method consists of coding the lengths of the black and white ranges in a line (modified HUFF-MANN code). Another coding method consists of noting the relative positions of the transitions of a line with respect to the preceding line (READ code). The coding methods used in telecopying are precise methods, i.e. the code produced contains all the information of the original document. The compression rate, i.e. the ratio between the number of bits of the digitized image and the number of bits of the code is approximately 10 to 20.

Press facsimile is a newspaper page transmission service used for the decentralized printing of newspapers. The processed documents are in this case pages on a photographic paper support with a size slightly below A2. The document is analyzed by very high resolution scanning of approximately 40 dots per mm. The digitized image produced is coded by a non-exact method utilizing the lengths of the white or black ranges on groups of several lines. This non-exact method leads to a smoothing of the information, which is not prejudicial if the document is analyzed with a very high resolution.

Finally, optical readers are machines for the reading, processing and compression of documents on paper supports solely containing the typed text. In order to permit correct processing, the document must satisfy certain criteria, particularly the inking and contrast. The digitization of the document is followed by the separation and recognition of the characters, which leads to an optimum coding of the document, e.g. by the ASCII code. The recognition of the characters is a particular method used for typed documents having clearly determined character type font. This is the only method for recognizing the content of the document and therefore for retaining a certain structural level, the compression obtained being of an optimum nature.

The known methods described hereinbefore all suffer from the disadvantage of being limited to paper documents of a size generally between A4 and A2. They also have specific advantages, i.e. a limited compression rate for telecopying machines, need for a very high resolution in facsimile machines and limitation to typed documents in the case of optical readers.

Coding methods for the document have also been proposed which combine the coding method used in telecopying machines and shape recognition methods. This mixed coding, compared with coding used in telecopying, makes it possible to obtain a higher compression rate and, compared with the optical reader, to process all documents on paper. Such coding methods are more particularly described in "Coding of two-level pictures by pattern matching and substitution" by O. JOHNSEN et al, published in The Bell system technical journal, vol. 62, No. 8, October 1983 and in "Combined symbol matching facsimile data compression system" by W. K. PRATT et al published in the proceedings of the IEEE, vol. 68, No. 7, July 1980.

On the basis of a binary image corresponding to the documents read, these coding methods consist of analyzing the document in order to separate or isolate the symbols (alphanumeric characters or other limited size shapes).

The first symbol is placed in a library and each following symbol is detected and then compared with each symbol in the library. If the detected symbol is already represented in the library, it is simply coded by the identification number of the corresponding symbol in the library. In the opposite case, said symbol is placed in the library. Each symbol in the library is then represented by a code equal to all the bits of the image of said symbol. In the method of PRATT et al, the image elements other than the symbols are coded by means of a coding method used in telecopying (HUFMANN or READ code).

The known machines using mixed coding methods solely comprise processing and compression means, but have no reading or scanning means. Moreover, these known machines are mainly aimed at telecopying. They perform a line-by-line analysis of the documents, i.e. a sequential processing and are intended essentially for dealing with A4 documents. Moreover, for certain known machines, particularly those realising the method of JOHNSEN et al, the document restoration quality is inferior. This is due to the fact that the large related shapes of the processed image are broken down into symbols.

SUMMARY OF THE INVENTION

The present invention more particularly aims at obviating the disadvantages and limitations of the known machines. A first object of the present invention is to make it possible to read documents of different types, such as paper documents, microfiches or the like. The machine according to the invention is consequently provided with a group of reading members, which are specific to a particular document type.

The invention also aims at obtaining a greater processing speed and flexibility of the documents read or scanned. This is achieved through the use of a two-bus architecture comprising an image bus and a communication bus. The image bus is used by a device for extracting the connected components of the digitized image corresponding to the read documents. The communication bus makes it possible to connect this extraction device to a coding device performing the coding of the connected components detected in the image. This two-bus structure makes it possible to separate the two functional levels of the processing, namely the segmentation of the image requiring a rapid, privileged access to the image memory and specific processing operations applied to the different elements extracted from the image.

The machine according to the invention can be of the dedicated or reconfigurable type. When it is dedicated to one application, the processing operations performed by the extraction device and the coding device are fixed and specific to the application. A machine designed for processing tight texts will then not be able e.g. to deal with plans or drawings.

In the case where the machine is called on to deal with documents whose content can both be text and drawings, it is advantageous to be able to reconfigure the machine. Means are then provided for modifying the processing performed by the extraction device or coding device as a function of the document read and particularly as a function of its content (typed text, plan, photograph, etc). These means can in particular carry out a teleloading of the extraction and coding programs in the extraction and coding devices.

More specifically the present invention relates to a machine for the reading, processing and compression of documents comprising an image bus for the transmission of at least part of a binary image; a communication bus for the transmission of control signals and for the transmission of coded signals representing the connected components of said binary image; a means for the reading of documents comprising a plurality of reading members, an interface and optionally binarization means, each reading member being specific to a document support and supplying a digital image signal of the read document, said interface supplying said digital image signals to the binarization means, said interface being connected to the communication bus, said binarization means being connected to the image bus and to the communication bus; an image memory connected to the image bus and receiving the binary image supplied the reading means; an extraction device for determining the connected components of the binary image and for classifying each connected component in one class from among a group of predetermined classes, said extraction device comprising at least one extraction means, each extraction means being formed from an extraction processor and an associated memory, each extraction means being connected to the image bus and to the communication bus; a coding device for coding the connected components, said coding device incorporating at least one coding means for each class, realising a specific coding of the connected components of the image belonging to said class, each coding means being formed by a coding processor and an associated memory and being connected to the communication bus; a merging means connected to the communication bus for gathering the code supplied by the coding device and developing a final code; and a control means connected to the communication bus comprising a computer and a control console for controlling the elements connected to the communication bus.

The binarization means is only necessary if one of the reading members supplies a non-binary digital signal.

In preferred manner, the extraction device can comprise several identical extraction means in parallel, the control means generating the distribution of tasks between said identical extraction means. In the same way, one or several coding means of the processing system can comprise several identical coding means in parallel, the control means controlling the distribution of tasks between said identical coding means.

This parallelization performed with respect to the extraction and with respect to the coding makes it possible to increase the processing speed of the documents read.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
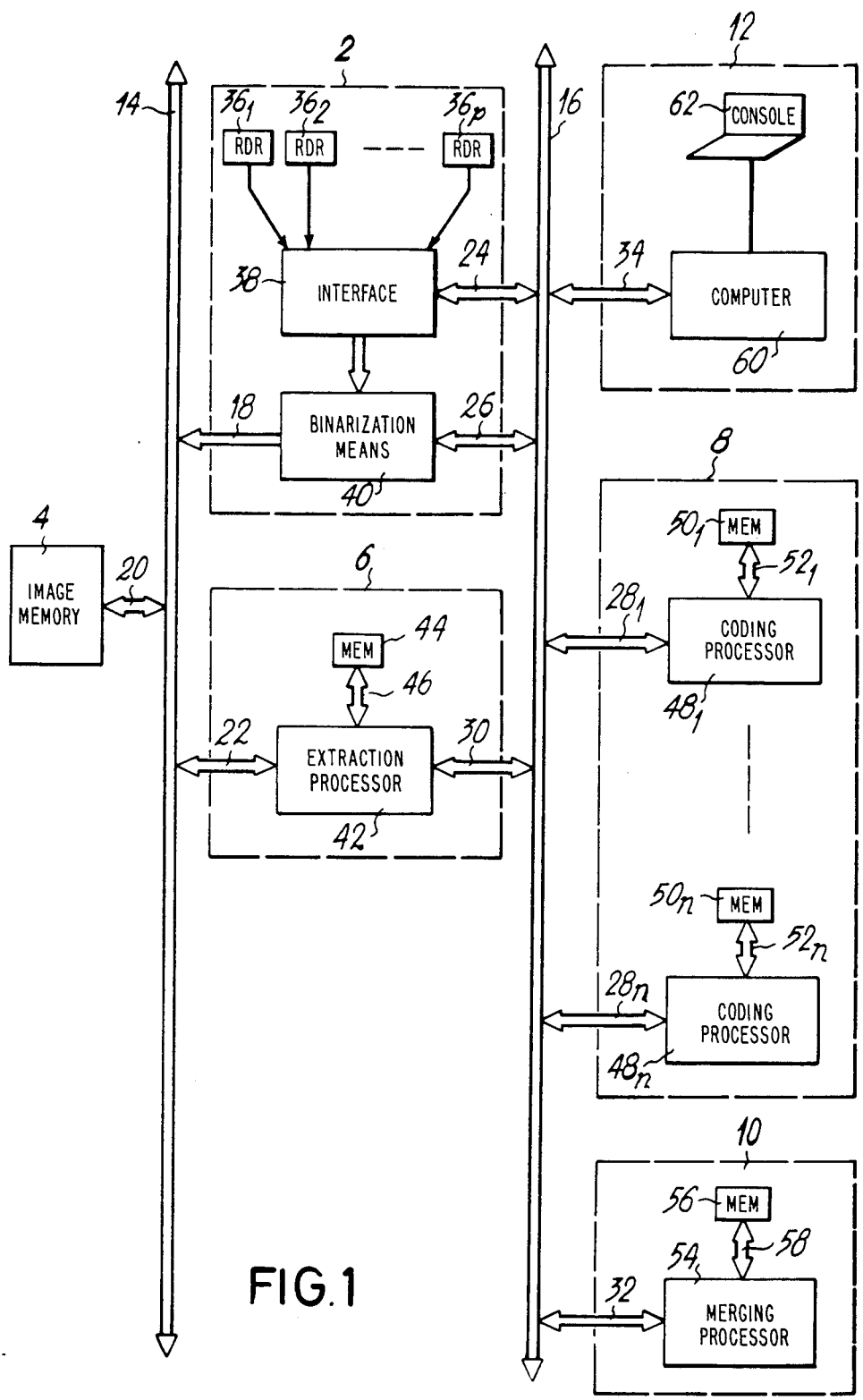
FIG. 1, diagrammatically the architecture of the document reading, processing and compression machine according to the invention.

FIG. 1 diagrammatically illustrates the structure of the document reading, processing and compressing machine according to the invention. This machine mainly comprises a reading or scanning means 2 for the scanning or reading of documents and the production therefrom of a binary image, an image memory 4 for storing said binary image, an extraction device 6 for analyzing the image contained in the image memory 4 and extracting therefrom the connected components, a coding device 8 for coding the connected components detected by the extraction device 6, a merging means 10 for producing a final code from the different codes produced by the coding device 8 and a control means 12.

The machine according to the invention is articulated around two buses, namely an image bus 14 and a communication bus 16. Each of these buses is associated with a functional level of the processing performed by the machine. Channels 18, 20, 22 respectively connect the reading means 2, the image memory 4 and the extraction device 6 to the image bus 14. The latter permits a rapid, privileged access to the image memory 4 by the extraction device 6 for segmenting the image and detecting its connected components.

Communication bus 16 is used for the dialogue between the different elements of the machine and permits the exchange of information extracted from the image contained in memory 4. Channels 24, 26 connect the reading means 2 to the communication bus 16. In the same way, a plurality of channels $28_1 \ldots 28_n$ connect the coding device 8 to the communication bus 16. Finally, channels 30, 32 and 34 respectively connect the extraction device 6, the merging device 10 and the control means 12 to the communication bus 16.

A more detailed description will now be given of each of the components forming the machine of FIG. 1. The reading or scanning means 2 comprises a plurality of the reading or scanning members $36_1, 36_2 \ldots 36_p$, an interface 38 connected to each of the reading members and connected by channel 24 to communication bus 16 and a binarization means 40 respectively connected by channels 18 and 26 to image bus 14 and communication bus 16.

The number of reading members varies. It is dependent on the number of documents of different types liable to be processed by the machine. The reading members can in particular comprise a paper document reading member, a microfiche reading member, an aperture card reading member or the like. The analysis resolution varies from one reading member to the other. The size of the digitized image can be limited, e.g. to the equivalent of a A0 format with 8 dots per mm.

The analysis performed by the reading members takes place whilst retaining the grey levels of the document. The binarization of the image is then performed by binarization means 40 which receives, across interface 38, the digitized document transmitted by a reading member. Preferably, said binarization is performed whilst taking account of local characteristics of the documents, in order to detect relatively small local contrasts and thus make it possible to improve the quality of the document read. The binarized image is stored in the image memory 4.

The extraction device 6 comprises an extraction processor 42 and a memory 44 connected to the extraction processor by a channel 46. Memory 44 has an instruction zone describing the extraction processing and a working zone for storing an element of the binary image and for the analysis thereof. The extraction device has the function of segmenting the image contained in the image memory 4 in order to extract the connected components therefrom.

According to the invention, the connected components detected by the extraction device are classified in a plurality of element classes, the elements of the same class having a certain unity and being coded according to a method specific to said class. By coding each connected component using a coded method adapted to its form, this method makes it possible to obtain a high compression rate of the document read. This compression rate is well above that obtained with a single coding method.

The connected components of a document can in particular be distributed into three classes, namely a vector class, a symbol class and a non-symbol class.

Vectors are vertical, horizontal or oblique lines and are particularly numerous in technical drawings or plans. They are detected by line-by-line or column-by-column scanning of the binary image. When the vectors have been recognized in the binary image, the connected components which remain are classified as a symbol or non-symbol, depending on whether there size is smaller or larger than a predetermined size.

Different procedures can be used for extracting the connected forms, particularly tagging, contour following and range following.

Tagging comprises tagging the dots encountered during line-by-line scanning of the image, the connected dots receiving the same tag. This method is more particularly described in the article "A new connected components algorithm for virtual memory computers" by R. LUMIA et al, published in Computer Graphics and Image Processing, vol. 22, 1983, pp. 287 to 300.

The contour following method consists of detecting the contour dots of the connected forms or shapes by examining the configuration of its vicinity for each dot. The main difficulties encountered in this method result from the following of internal contours and object inclusions. A contour following method is described in "Chain link coding and segmentation for raster scan devices" by R. CEDERBERG, published in Computer Graphics and Image Processing, vol. 10, 1979, pp. 224 to 234.

Finally, the range following method consists of detecting a black range on a scanned line, investigating the related black ranges on the adjacent lines, storing them in a stack and clearing the image. This mechanism is reiterated starting with the ranges of the stack until the stack is exhausted.

Each detected connected component is transmitted to the coding device 8. This transmission comprises three information types, namely the position of the connected component in the processed image, the description of the shape of the connected component linked with the extraction method used and the characteristics extracted at the same time as the shape and which are useful for the coding device, such as the dimensions of the shape (height, width), the number of black dots, the number of ranges per line or the like.

The coding device 8 comprises at least one coding means per element or component class. Each coding means comprises a coding processor $48_1 \ldots 48_n$ connected to a memory $50_1 \ldots 50_n$ by a channel $52_1 \ldots 52_n$. Each memory has a working zone and a zone containing a sequence of instructions for carrying out coding of the connected components, one specific code being associated with each class of elements.

The coding device 8 can in particular comprise a coding means associated with a class of vectors, a coding means associated with a class of symbols and a coding means associated with a class of non-symbols.

The coding device 8 of the machine according to the invention has a greater flexibility than coding devices in known machines. Thus, the number of coding means, i.e. the number of classes in which the related components of the process document are distributed can be adapted to each machine as a function of its particular application.

Two machines dedicated to different applications can therefore comprise fixed, but different coding means. For a reconfigurable machine, the processing performed by the coding device can be in the form of one program chosen from among a group of programs, as a function of a particular application and teleloaded into the coding device. Choice and teleloading can be realized by the control means 12.

In the same way, the extraction method used by the extraction device 6 can be adjusted as a function of the processed documents. For a reconfigurable machine, the extraction method used is represented by a sequence of instructions contained in the zone of the memory 44 associated with the extraction processor 42. The control means 12 can advantageously comprise a group of extraction methods in a storage means and control the writing of one of these extraction methods into the extraction memory 44 as a function of the processed documents. The choice of the extraction method and the structure of the coding device 8 must be compatible.

A successive description will be given of the coding methods corresponding to the vector, symbol and non-symbol classes. The recognized vectors are simply stored by there coordinates (origin, extremity) and there thickness. The coding of a symbol consists of compressing the number of bits necessary for its representation, whilst retaining the information which it contains. To this end, the code used is a psuedo-recognition method. Such methods are more particularly described in the articles by PRATT et al and JOHNSEN et al referred to hereinbefore. In general terms, psuedo-recognition consists of producing a library of the symbols of a document during the analysis of the latter. When a symbol is received by the coding means associated with the class of symbols, three cases can occur:

no model in the library represents the symbol received, so that the symbol is then added to the existing library;

a single model in the library represents the symbol received;

several models in the library can represent the symbol received and the symbol is then allocated to the closest model.

A symbol is then coded by its position in the document and by the reference to its representation in the library. For the latter, the coding can e.g. consist of a HUFMANN or READ code on the matrix containing the symbol.

Finally, the connected components of the class of non-symbols are coded in the same way as the representatives of the symbols. This code is preceded by the position and dimension of the connected component.

The codes produced by the different coding means of the coding device 8 are then transmitted to the mergin means 10. The latter comprises a merging processor 54, to which is connected a memory 56 by a channel 58. This merging means produces a final code from the code supplied by the coding means.

The compression rate obtained, i.e. the ratio between the number of bits of the binary image contained in the image memory 4 and the number of code bits is on average 70. This rate is to be compared with the average rate of 20, which would be obtained if the binary image where entirely coded according to the READ code, as is the case in telecopying.

The control means 12 shown in FIG. 1 comprises a computer 60 and a control console 62. The control means controls the operation of the different components of the machine and more particularly makes it possible to supply a read or scan instruction relative to a document to the reading member via interface 38, received from the binarization means 40 a signal indicating that the binary image corresponding to the document read is stored in the image memory 4, to give an extraction instruction to the extraction device 6 to determine the connected components of the image memory 4, to receive the requests from the extraction device 6 for the transfer of a connected component to a coding means of the coding device 6, to give the coding instructions, receive the requests from the coding means for the transfer of codes to the merging means 10 and to give merging instructions.

The extraction means comprises a processor and a memory in which are contained instruction representing the extraction method used. In a dedicated machine, this group of instructions can be contained in a read-only memory. In a preferred manner, in a reconfigurable machine, said group of instructions is contained in a random-access memory. The extraction method can thus be modified as a function of the documents read. The extraction method used at a given time can e.g. be chosen and transmitted to the extraction device 6 by the control means 12 as a function of the documents read.

In the same way, the coding means perform coding processes represented by a sequence of instructions in a memory. Advantageously, in a reconfigurable machine, the coding process of each coding means, as well as the number of coding means used is defined by the control means 12.

The machine according to the invention shown in FIG. 1 makes it possible to process documents of all types (typed texts, plans, diagrams, etc) on numerous different physical supports. In certain special cases, the processing speed of the machine can be limited. This is more particularly the case when the processed document has a large number of connected components, e.g. in the case of a dense typed document. To increase the treatment or processing speed, the extraction device 6 can then be equipped with a group of extraction means in parallel. In the same way, a group of identical coding means in parallel can be provided for coding each class of connected components.

Figure 2:
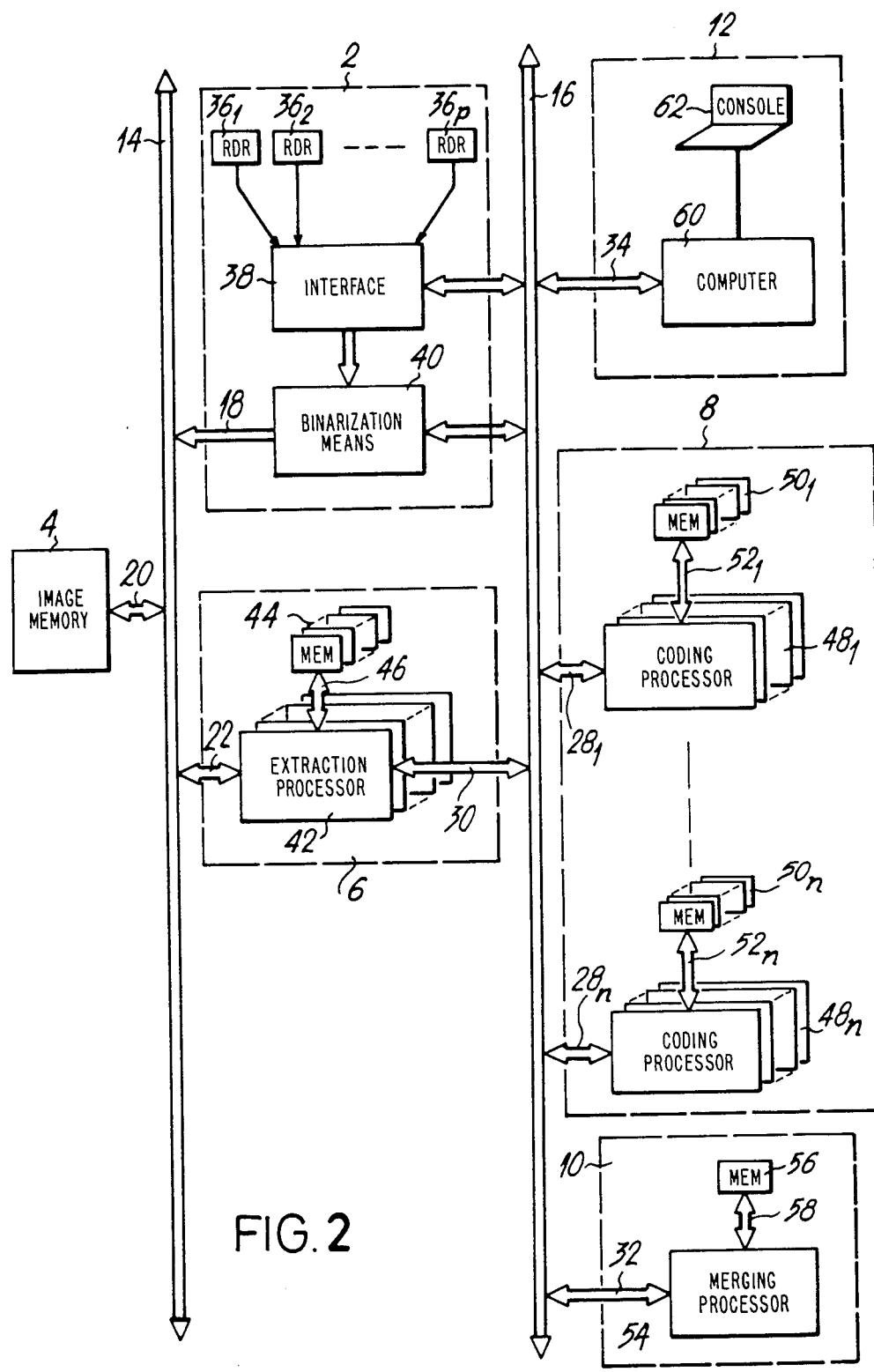
FIG. 2, a variant of the machine of FIG. 1 permitting a parallelization of the extraction and coding tasks.

FIG. 2 illustrates a variant of the machine according to FIG. 1 in which the extraction device and the coding device have in each case a plurality of processors working in parallel. In FIG. 2, the elements identical to those of FIG. 1 carry the same references.

What is claimed is:

1. A machine for the reading, processing and compression of documents comprising:

(a) reading means for the acquisition of documents comprising a plurality of reading members and an interface, each reading member being specific to a type of document and supplying an electronic image signal of an acquired document, the interface comprising a plurality of inputs, each connected to a reading member for receiving an electronic image signal;

(b) an image memory for storing an image supplied from the reading means;

(c) an extraction device for determining the connected components of an image memorized in the image memory, and for classifying each connected component in one class from among a plurality of predetermined classes, said extraction device comprising at least one extraction means, each one comprising an extraction processor and an associated memory means;

(d) a coding device comprising at least one coding means for each class, each coding means generating a specific coding of the connected components of the image belonging to said class and supplying a code corresponding to said connected component, each coding means comprising a coding processor and an associated memory means;

(e) a merging means for gathering the codes supplied by the coding device and developing a final code representing a compressed, coded signal of the acquired document, wherein said machine comprises:

(f) an image bus for the transmission of at least parts of a digital image, said image bus connecting the image memory, the reading means, and the extraction device; and (g) a communication bus for the transmission of control signals between the control means, the reading means, the extraction device, the coding means and the merging means, and for the transmission of coded signals representing connected components between the extraction device, the coding means, and the merging means.

2. A machine according to claim 1, wherein the reading means also comprises a binarization means, which is connected to the image bus and to the communication bus, said binarization means receiving the digital image signals supplied by the interface.

3. A machine according to claim 1, wherein the reading means comprises at least one microfiche reader, an aperture card reader and a paper document reader.

4. A machine according to claim 1, wherein the extraction device comprises several identical extraction means in parallel, the control means controlling the distribution of tasks between these identical extraction means.

5. A machine according to claim 1, wherein the connected components are extracted into at least three classes, namely a class of vectors, a class of symbols and a class of non-symbols, the coding device having at least one coding means for each class.

6. A machine according to claim 1, wherein for at least one class, the coding device comprises a plurality of identical coding means in parallel, the control means controlling the distribution of the tasks between these identical coding means.

7. A machine according to claim 1, wherein the control means is able to transmit to each extraction means a sequence of instructions defining the extraction method of said extraction means, said extraction method being chosen from among a plurality thereof as a function of the documents read.

8. A machine according to claim 1 wherein the control means is able to transmit to each coding means a sequence of instruction defining the specific coding method of said coding means, said coding method being chosen from among a plurality thereof as a function of the documents read.

* * * * *